Patented Apr. 28, 1936

2,039,178

UNITED STATES PATENT OFFICE 2,039,178

METHOD OF ENAMELING

Wesley G. Martin, Milwaukee, Wis., assignor to A. O. Smith Corporation, Milwaukee, Wis., a corporation of New York No Drawing. Application May 18, 1934, Serial No. 726,306

3 Claims. (Cl. 91—73)

This invention relates to a method of fusing a coating of vitreous enamel to the interior surfaces of tanks.

An object of the invention is to provide a method for the production of glass-lined tanks.

Difficulty has been experienced in firing tanks to produce a uniform and satisfactory glass lining on the interior surface. A steel tank provided with a coating of enamel on its interior surface, covers over the openings in the tank, and an exhaust pipe to permit the escape of the air in the tank when it was heated and consequently expanded during the firing operation, was introduced into a gas-fired furnace, not provided with a muffle, and heated to a sufficient temperature for a sufficient length of time to fuse the enamel lining of the tank. Inspection of the tank after the firing was completed showed that the lining was defective in that it had numerous copperheads. Further tests confirmed the result that an excessive number of copperheads is produced when glass-lined tanks are fired in the above-described manner.

It was then found that the difficulties caused by excessive copperheading were avoided and a satisfactory lining was produced if air was introduced into the tank during the fusion of the enamel and allowed to escape through the joints around the covers over the openings in the tank.

In practicing this invention, the interior surface of the tank is cleaned in any suitable manner and a coating of enamel is applied. This may be done with a spray gun or by other means. In general, the tanks are provided with several openings to permit access to the interior. These openings are provided with suitable covers, and a pipe of sufficient length to extend beyond the furnace is connected to the tank to permit air to be pumped into it during the fusion of the enamel. It is a matter of considerable difficulty to provide the openings in the tank with covers which will maintain a tight joint when the tank is introduced into the furnace and heated to fuse the enamel. In practicing this invention it is unnecessary to take the trouble to provide tight fitting covers since the air which is forced into the tank during fusion of the enamel is allowed to escape through the joints between the covers and openings, although a separate exit pipe for air may be provided if desired. As the air escapes from the tank it carries along gases produced during the fusion of the enamel.

The tank thus provided with a coating of enamel mixture on its inner surface, covers for the openings in the tank, a pipe for introducing air into the tank, and openings to provide a means for the escape of air, is introduced into the firing furnace and heated to fuse the enamel. As the temperature increases the air in the tank expands and is allowed to escape at a sufficient rate to prevent building up a pressure sufficient to injure the tank in its heated condition, in which the steel or other material of which it is made is of much lower strength than at ordinary room temperatures. In some cases the openings provided for the escape of the air may be of insufficient extent to provide for a sufficiently rapid rate of escape during the period when the tank is rapidly increasing in temperature after its introduction into the furnace. In such cases, air may be also allowed to escape through the pipe provided for the introduction of air into the tank. To provide for this contingency the pipe should have a valve permitting the escape of air to the atmosphere and a manometer or pressure gauge for measuring the pressure in the tank. By proper regulation of the valve, the pressure within the tank may be maintained slightly above atmospheric pressure during the time the tank is increasing in temperature.

Air is then forced into the tank while the enamel is being fused to maintain within the tank a pressure which is somewhat greater than the atmospheric pressure. After the tank has been held within the furnace for a sufficient length of time to fuse the enamel, it is withdrawn from the furnace and allowed to cool. Care must be taken during the cooling of the tank to prevent the contraction of the air which it contains from causing a diminished pressure that might cause collapse of the tank. In many instances it will be found desirable to maintain within the tank a pressure somewhat greater than atmospheric throughout the entire period of cooling.

Satisfactory results have been obtained in the practice of this invention by maintaining a pressure within the tank of two or three inches of water in excess of atmospheric pressure and introducing some eighty to two hundred cubic feet of air per minute, but more or less can be used. For large, thin-walled tanks of circular cross section, it is frequently of advantage to restrict the openings through which air can escape in order to build up an appreciable pressure within the tank to assist in maintaining its shape while in a heated condition.

Any suitable enamel may be used in the practice of the invention and will be chosen in accordance with the kind of lining desired. The temperature at which the enamel is fired will be so chosen as to be suitable for the kind of enamel used and the time of firing will be made sufficient to secure satisfactory fusion. Excellent results have been obtained with an enamel which can be fired at 1600° F. Some thirty-five to forty minutes may be required to fire large tanks, and twenty to thirty minutes for small tanks, but the temperature and time of firing form no part of this invention and will be suitably chosen by those skilled in the art in a manner which is well known.

I claim:

1. In the manufacture of glass-lined tanks, the steps which comprise introducing air into the tank during the fusion of the enamel to maintain within the tank a pressure in excess of the atmospheric pressure, and allowing air to escape from the tank to provide a passage of air therethrough.

2. In the manufacture of glass-lined tanks of circular section the steps which comprise introducing air into the tank during the fusion of the enamel to create within the tank a pressure which is in excess of the atmospheric pressure in order to assist the strength of the material from which the tank is made in maintaining the circular section of the tank, and allowing air to escape from the tank to provide a p ssage of air therethrough.

3. In the enameling of the interior surface of a large, thin-walled tank of circular section, the method of maintaining the shape of the tank while it is in a heated condition during the firing of the enamel which comprises restricting the opening or openings through which air may escape from the tank so as to permit only a limited flow of air from the tank while it is in a heated condition, said limited flow being greater than zero, and forcing air into the tank at a sufficient rate to maintain within the tank a pressure greater than atmospheric pressure.

WESLEY G. MARTIN.